United States Patent [19]

Casey

[11] 4,355,606

[45] Oct. 26, 1982

[54] IDLE SPEED CONTROL VALVE

[75] Inventor: Gary L. Casey, Troy, Mich.

[73] Assignee: The Bendix Corporation, Southfield, Mich.

[21] Appl. No.: 99,230

[22] Filed: Nov. 30, 1979

Related U.S. Application Data

[62] Division of Ser. No. 947,909, Oct. 2, 1978, abandoned.

[51] Int. Cl.[3] ........................ F16K 31/128; F02M 3/00

[52] U.S. Cl. .................................... 123/327; 123/339; 251/30; 251/38

[58] Field of Search ............... 123/319, DIG. 11, 327, 123/360, 378, 389, 339; 251/30, 39, 45, 46, 133; 261/DIG. 19

[56] References Cited

U.S. PATENT DOCUMENTS

| | | | |
|---|---|---|---|
| 2,738,157 | 3/1956 | Vargo | 251/30 |
| 2,824,460 | 2/1958 | Davis | 251/33 |
| 3,661,131 | 5/1972 | Croft | 123/360 |
| 3,756,208 | 9/1973 | Toda et al. | 123/331 |
| 3,797,526 | 3/1974 | Champeon | 251/30 |
| 3,852,391 | 12/1974 | Hisatomi et al. | 261/DIG. 19 |
| 3,866,583 | 2/1975 | Pundt et al. | 123/327 |
| 3,994,318 | 11/1976 | Ishigaki | 251/30 |

*Primary Examiner*—Craig R. Feinberg
*Attorney, Agent, or Firm*—Gaylord P. Haas, Jr.; Russel C. Wells

[57] ABSTRACT

An idle speed control valve for use in controlling the idle speed of an engine wherein the control valve utilizes a pilot valve to control a valve lift assist force generated by a pressure acting on a differential area associated with the valve. The control valve is actuated in response to a desired speed signal generated by sensed engine conditions as compared to the actual speed of the engine.

1 Claim, 4 Drawing Figures

IDLE SPEED CONTROL VALVE

This is a division of application Ser. No. 947,909, filed Oct. 2, 1978 now abandoned.

BACKGROUND AND SUMMARY OF THE INVENTION

This invention relates generally to an engine idle speed control valve and more particularly an idle control valve including an integral servo boost pilot valve for amplifying the opening force on the valve.

Prior internal combustion engines have, on occasion, been provided with fast idle and/or idle speed controllers for controlling the idle speed of the engine. These previous controllers have been fabricated with a valve for controlling air into the intake manifold, the valve being opened and closed by a direct acting actuator. In some cases, the actuator was connected to open the main throttle valve or to operate directly on an air bypass valve. With the vacuum generated at the intake manifold and atmospheric pressure above the valve creating a pressure differential across the valve, and the requirement for a fast response in controlling the operation of the valve, it was found that a large, expensive actuator was required to meet the operational requirements of the engine.

In order to reduce the size and expense of this valve, the present invention contemplates providing a pilot valve arrangement associated with the main valve whereby the pilot valve is opened to reduce the pressure within the main valve housing, this reduced pressure acting on a larger area than the area exposed to the vacuum within the intake manifold. Thus, an amplification of the actuator force occurs with this arrangement which may be described as a valve with an integral servo boost for amplifying the actuator force.

With this type of arrangement, the actuator need only be of sufficient size to rapidly move a relatively small pilot valve rather than moving the entire main valve. The reduced pressure within the valve housing is then utilized to cause the main valve to open. This causes the pilot valve to move toward the closed position until such time as an equilibrium is achieved, whereby the pressure on the interior of the valve housing acting on its area is equal to the pressure on the valve plate with respect to its area. Thus, the size and cost of the actuator is substantially reduced.

Accordingly, it is one object of the present invention to provide an improved idle speed control valve.

It is another object of the present invention to provide an idle speed control valve which incorporates a mechanism for utilizing the manifold vacuum in opening the control valve.

It is another object of the present invention to provide an improved valve whereby when minimum idle speed is required, the pilot valve flow as well as the main valve flow are shut off.

It is still a further object of the present invention to provide an improved control valve as described above whereby the response of the valve may be improved by adjusting the size of the pilot valve.

It is still a further object of the present invention to provide an improved control valve which incorporates a servo assist which is proportional to engine vacuum.

It is still another object of the present invention to provide a servo boost for a control valve which varies as a direct function of the force resisting opening of the control valve.

It is still another object of the present invention to provide an improved idle speed control valve having uniform performance throughout the operating range of the engine.

It is still a further object of the present invention to provide an improved control valve having a servo boost during the time that the engine is operating and a direct opening of the control valve when the engine is not operating.

It is still another object of the present invention to provide an improved control valve which is inexpensive to manufacture and has an actuator which is substantially reduced in size and highly reliable in operation.

Further objects, features and advantages of the present invention will become readily apparent upon an understanding of the following specification and the attached drawings in which:

DETAILED DESCRIPTION OF THE DRAWINGS

Figure 1:
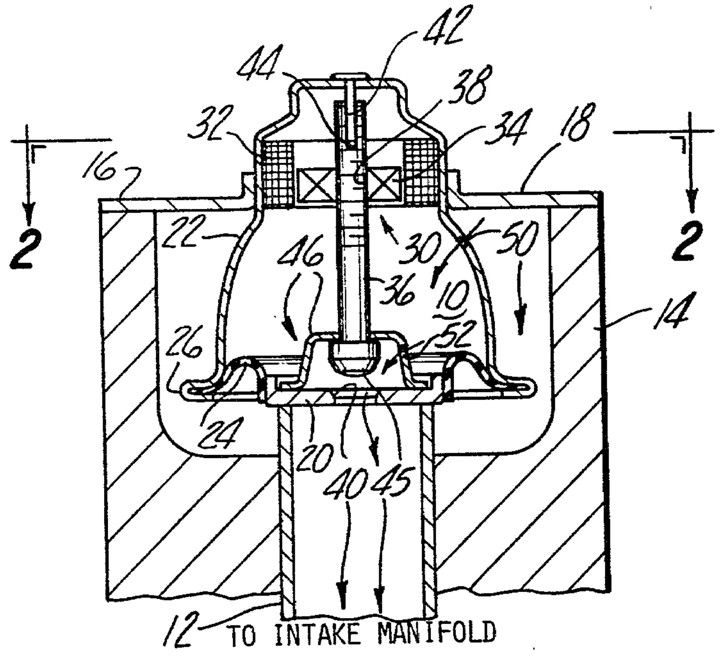
FIG. 1 is a sectional view of the idle speed control valve assembly incorporating certain features of the present invention.
Figure 2:
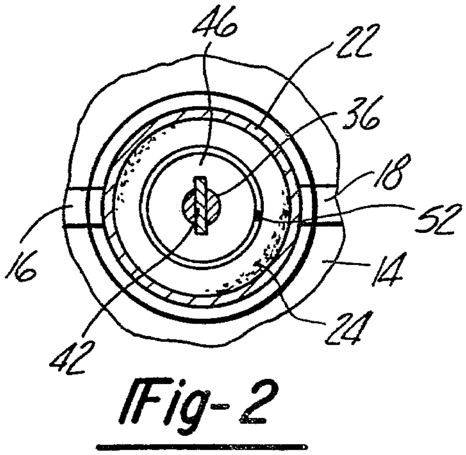
FIG. 2 is a cross-sectional view of FIG. 1 taken along line 2—2 thereof.

Referring now to FIG. 1, there is illustrated an idle speed control valve 10 which is utilized to control the supply of auxiliary air to an intake manifold 12 associated with an internal combustion engine. The intake manifold conduit 12 is schematically illustrated and is shown to be supported in a portion of a manifold 14. The valve 10 is illustrated as being supported relative to the conduit 12, and on the manifold portion 14, by means of a pair of arms 16, 18 which may be removeably attached to the manifold portion 14 thereby permitting removal of the control valve 10 from the manifold portion 14.

Referring particularly to the details of the control valve 10, the main valving portion includes a generally flat plate 20 which is resiliently attached to a bell-shaped housing 22 by means of a diaphragm element 24. Thus, the valve element 20 is permitted to move vertically along the axis of the bell-shaped housing 22 in response to force applied thereto. The diaphragm 24 may be attached to valve element 20 by means of a suitable adhesive or other attachment means and the diaphragm 24 is attached to the bell-shaped housing 22 by means of a crimping operation wherein the lower end of the bell-shaped housing is folded over onto the edge of the diaphragm 24 at edge 26.

The valve element 20 is illustrated as being seated on the upper edge of conduit 12, which edge forms a valve seat for the valve element 20. The valve is actuated by means of an actuator assembly 30 which includes a permanent magnet motor schematically illustrated as having a permanent magnet stator element 32 and a brush-fed wound rotor 34. The energization of the wound rotor will be more fully described in conjunction with the description of FIG. 4. The motor 30 is utilized to move a pilot valve element 36 along the axis of the motor by means of a threaded portion formed on the exterior surface of the pilot valve element 36 and a second threaded portion 38 formed on the inner surface of the rotor 34. Thus, as the rotor 34 moves in one direction, the pilot valve element 36 will be moved upwardly to the position shown. If the motor is rotated in the opposite direction, the pilot valve 36 will be moved downwardly into engagement with a pilot valve seat 40 formed in the valve plate element 20. The pilot valve element 36 is constrained from rotary motion by means of a flat pin element 42 which is fitted into a slot 44 formed in the end of the pilot valve element 36. Thus, the pilot valve is constricted from rotary motion and the rotor is constrained from axial motion whereby the rotation of the armature 34 will cause the pilot valve element 36 to move upwardly and downwardly in response to the rotary motion.

The upward movement of the pilot valve pin 36 causes valve head 45 to engage a second bell-shaped housing element 46. Further movement of pilot valve pin 36 will cause the valve pin to lift the valve plate 20 from the valve seat at the upper edge of conduit 12. This operation occurs when the engine is not running and is desired to bleed air to the intake manifold prior to starting the engine.

When the valve assembly is initialized, which is the same as is depicted in FIG. 1 except that the pilot valve is closed, the valve element 45 is in engagement with valve seat 40, and air is blocked from entering the conduit 12. Upon energization of the motor 30, the valve stem 36 is raised upwardly to cause valve head 45 to move away from valve seat 40. When this occurs, air enters aperture 50 into the interior of bell-shaped housing 22 and then through aperture 52 into the interior of bell-shaped housing 46. This air will then flow into the interior of conduit 12 thereby reducing the pressure in the interior of housing 22 and the interior of housing 46 when the engine is running. This is due to the reduced pressure caused in the intake manifold due to the operation of the engine. The size of orifice 50 is such that the pressure within the housing 22 is sufficiently reduced to permit atmospheric pressure acting on the lower surface of valve member 20 to overcome the resisting force produced by intake manifold pressure.

Figure 3:
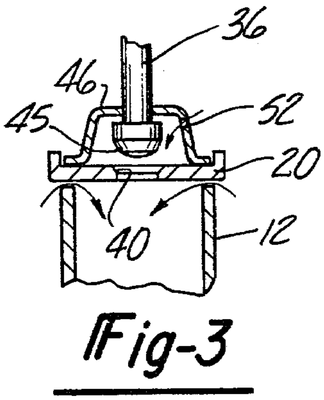
FIG. 3 is a sectional view of FIG. 1 when the valve reaches the equilibrium mode of operation from that shown in FIG. 1.

This reduced pressure in the interior of housings 22 and 46 acts on the entire upper surface of valve plate 20. The reduced pressure in conduit 12 acts on the area of valve plate 20 defined by the inside diameter of conduit 12. Thus, there is a net downward force created by the pressure in housing 22 which is overcome by atmospheric pressure. This causes a lifting force to be created which will lift valve plate 20 from the upper edge of conduit 12. As the valve plate 20 lifts, valve seat 40 is caused to be positioned closer to valve head 45 until such time as an equilibrium position is reached whereby the valve member is slightly spaced from valve seat 40. The force created on valve plate 20 due to the reduced pressure in the interior of housings 22 and 46 is equal to the force created by the reduced pressure below the valve plate 20. This equilibrium position is maintained until such time as the motor 30 is energized in the opposite direction to cause the valve head 45 to be placed into engagement with the valve seat 40. This equilibrium position is graphically shown in FIG. 3.

If the engine is not operating and it is desired to provide additional air to the engine upon starting, the motor 30 may be energized to cause valve pin 36 to rise and cause valve head 45 to engage housing 46. Upon further movement upwardly of pin 36, the valve plate 20 will be lifted off the valve seat created by the upper edge of conduit 12.

Figure 4:
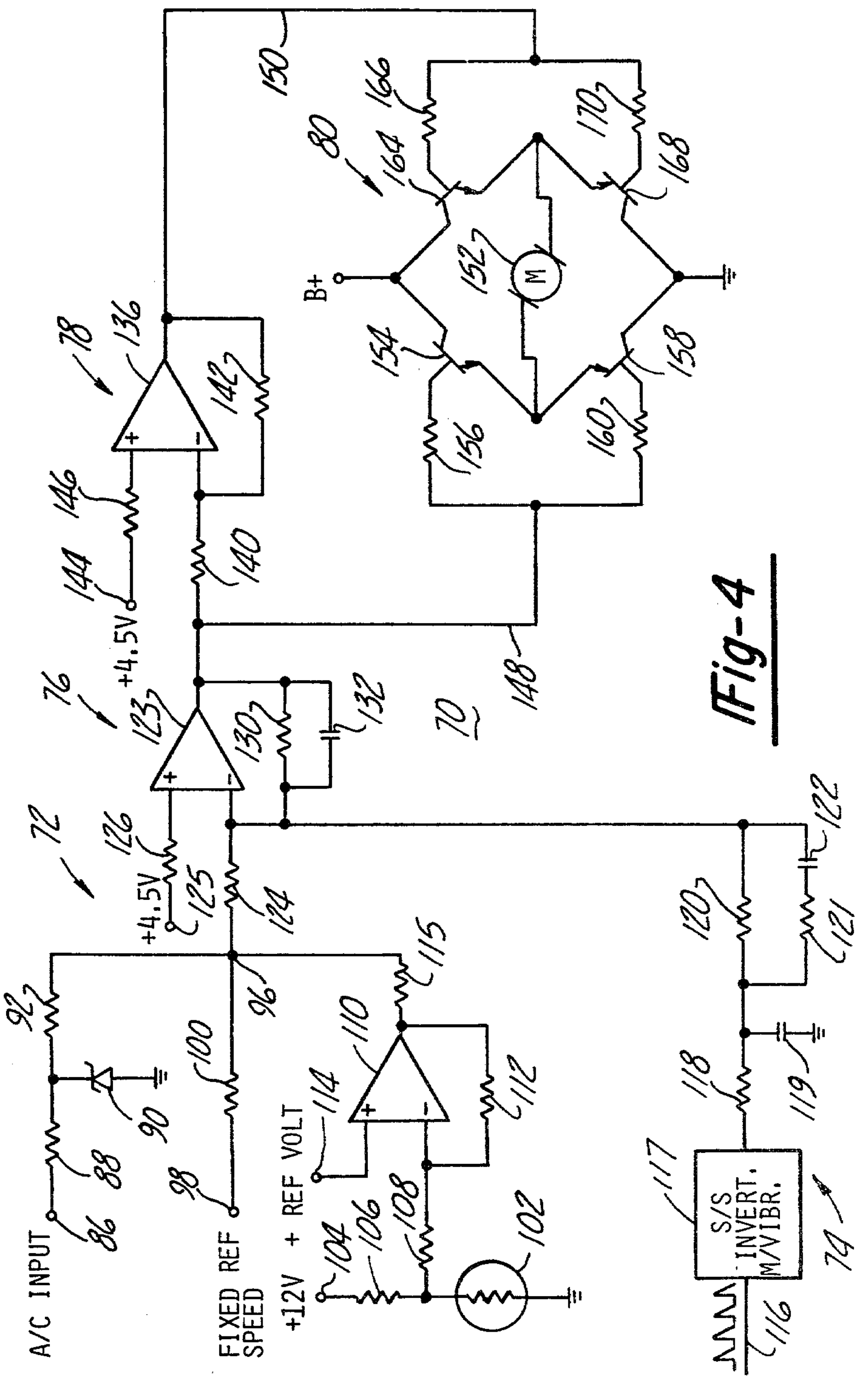
FIG. 4 is a schematic diagram illustrating the control circuit for the actuator motor of FIG. 1.

Referring now to FIG. 4, there is illustrated a schematic diagram of a circuit of a control circuit 70 which is an illustration of one method of an apparatus of controlling the motor 30 described in conjunction with the description of FIG. 1. While the system 70 of FIG. 4 illustrates a preferred circuit for controlling the motor 30, it is to be understood that motor 30 could be a stepping type motor or some other type of electric motor and system 70 would change accordingly. Also, it is to be understood that other means for actuating the pilot valve 36 may be utilized, as, for example, a fluid type actuator. The system to be described with respect to FIG. 4 utilizes two engine operating conditions for providing idle speed control whereby the engine idle speed is increased. For example, if the air conditioning is being operated and the engine is at idle, it would be desirable to increase the idle speed. Similarly, if the engine is cold, it would be desirably to increase the engine speed at idle. Thus, the circuit of FIG. 4 accomplishes this end.

Generally, FIG. 4 includes a desired speed signal generating circuit 72 and an actual speed generating circuit 74. The sum of the outputs of circuits 72,74 is fed to a first amplifier circuit 76 and thereafter to a second amplifier circuit 78. The output of the first amplifier circuit 76 varies from a fixed reference (4.5 volts) by an amount related to the sum of the outputs of circuits 72,74 in a first direction, and the output of the second amplifier circuit varies from the reference level by an equal amount, but in the opposite direction. The two output signals are fed to a transistor bridge circuit 80 which is connected to control the direction and speed of motor 30 as will be more fully explained hereafter.

Referring now to the details of FIG. 4, it is seen that an air conditioning clutch provides an input signal to input terminal 86, the signal then being fed through resistor 88 and shunt zener diode 90 and resistor 92 to a node 96. The zener diode 90 is utilized to prevent negative voltage excursions which may occur from an inductive device connected to the input terminal 86, and the resistor 88 is utilized to limit the current flowing in the circuit. Thus, the voltage level at node 96 will increase when the air conditioning unit is being operated.

The node 96 is also provided with a reference bias voltage being fed to the node 96 from an input terminal 98 through a resistor 100. The reference voltage at terminal 98 is a voltage which is indicative of a preselected engine speed. This preselected engine speed is a speed which is desired when the other conditions are not present, for example, the air conditioning is off and the engine is at operating temperature.

The engine temperature is sensed by means of a temperature sensing resistor 102. The temperature sensing resistor being supplied with energy from a DC source connected to an input terminal 104 through a resistor 106. Thus, as the engine temperature changes the resistance of resistor 102 will change. This will increase or decrease the voltage at the upper end of temperature sensing resistor 102 to increase or decrease the current being fed through a resistor 108 to an operational amplifier 110. The operational amplifier includes a feedback resistor 112 and the non-inverting input is fed a reference voltage from an input terminal 114. The output of operational amplifier 110 is connected to node 96 through a resistor 115. Thus, if the engine is cold and the current flowing through resistor 102 is high, a high voltage will be fed to node 96 increasing the voltage at that summing node.

Thus, the fixed speed referenced voltage at node 96 corresponding to a desired idle speed if the air conditioning is not on and the engine temperature is at operating temperature, is increased when the air conditioning is turned on and/or when the engine temperature is below operating temperature. This, in effect, commands the system to cause the engine to operate at a higher idle speed.

The actual engine speed is sensed by means of a train of pulses being fed an input conductor 116, the frequency of the input pulse corresponding to the engine speed. This signal is fed to a single-shot, inverting multivibrator which has the characteristic that its voltage output goes down as the engine speed goes up. Particularly, the output of the single-shot inverting multivibrator 117 is always high except for a fixed period of time when the output goes low upon sensing each engine pulse. The output of the multivibrator 117 is fed through a filter, including a resistor 118 and a capacitor 119.

A lead network is provided including a resistor 120 and a series combination of resistor 121 and capacitor 122 to provide an output signal from the lead network which is the sum of the actual engine speed plus a derivative of engine speed to prevent stall in the event that the engine speed is rapidly decreasing.

The desired engine speed signal from circuit 72 and the actual engine speed signal from circuit 74 are fed to the inverting input of an operational amplifier 123 through a resistor 124 in the case of the desired engine speed. The non-inverting input of operational amplifier 123 is connected to a positive 4.5 volt source of potential at input terminal 125 through a resistor 126. The feedback loop of the operational amplifier 123 includes a parallel combination of a resistor 130 and a capacitor 132, the capacitor 132 acting as a high frequency filter.

The output of amplifier circuit 76 is fed forward to the amplifier circuit 78 and particularly to the inverting input of an operational amplifier 136 through a resistor 140. The amplifier is provided with a unity gain through the means of a resistor 142 connected in the feedback loop. The non-inverting input is fed with a positive 4.5 volt source of potential connected to input terminal 144 through a resistor 146.

The output of operational amplifier 123 and operational amplifier 136 are fed to the voltage follower bridge circuit 80 by means of conductors 148 and 150 respectively. The voltage on conductor 148, if the desired speed is not equal to the actual speed, will differ from 4.5 volts by a certain amount depending on the speed difference between actual speed and desired speed. On the other hand, the output voltage from amplifier 136 will vary from 4.5 volts in the opposite direction from that of amplifier 123 by an equal amount. Thus, the error signal between conductors 148 and 150 is double the function of the actual error signal flowing in resistor 124.

Referring first to the signal at conductor 148, this signal is fed to an NPN transistor 154 through a resistor 156, the transistor 154 forming one leg of bridge circuit 80. The signal on conductor 148 is also fed to a PNP transistor 158 through a resistor 160. On the other hand, the signal at conductor 150 is fed to an NPN transistor 164 through a resistor 166 and to a PNP transistor 168 through a resistor 170. The upper node of the bridge is connected to B+ and the lower node is connected to ground. A motor 152 to be controlled is connected across the midpoints of the bridge in a conventional manner.

Thus, assuming the voltage on conductor 148 is 4 volts and the voltage on conductor 150 is 5 volts, the transistor 158 will be conductive and the transistor 164 will be conductive, and transistors 154 and 168 will be non-conductive. Thus, current will flow from B+ through transistor 164, through motor 152, through transistor 158, to ground. On the other hand, if the voltage on conductor 148 is 5 volts and the voltage on conductor 150 is 4 volts, the opposite condition will occur and the motor will reverse. In this situation, transistors 154 and 168 will be conductive and transistors 158 and 164 will be non-conductive. Thus, current will flow from B+ through transistor 154, through motor 152, and through transistor 168, to ground.

The particular bridge circuit shown has been somewhat simplified in the sense that suitable bias voltages should be applied to eliminate any hysteresis in the circuit due to the base-emitter drops of the transistors 154, 158, 164 and 168. However, it is seen that a voltage proportional to the difference between the actual speed and the desired speed will be supplied motor 152 in the proper direction to cause the pilot valve 36 to move in the proper direction to effect the control desired, either increasing or decreasing idle speed.

Obviously, other modifications, additions and deletions may be made to the above-described system in order to accomplish the objects of the invention without departing from the fair meaning of the sub-joined claims.

What is claimed is:

1. A method of controlling the flow of fluid from a pressurized source of fluid to a volume adapted to have a reduced pressure relative to the pressurized source with a valve having a valve seat and a valve element associated therewith for controlling the fluid flow, the valve element having a first fully opened and a second fully closed position, the valve element having a pilot valve seat formed therein, a pilot valve member mateable with the pilot valve seat, and an actuator connected to the pilot valve member, the method for fixing the position of the valve element at a position intermediate the first and second position irrespective of the magnitude of the pressure of the pressurized source or the reduced pressure, comprising the steps of: operating an actuating means for moving the actuator to move the pilot valve member away from the pilot valve seat to an intermediate incremented position, wherein said actuating means comprises a rotor member for rotating the actuator in one direction to axially increment the actuator progressively away from the valve seat and rotating the actuator in an opposite direction to axially increment the actuator progressively toward the valve seat and maintaining the actuator at the incremented position of the valve element in the absence of rotation; and then moving the valve element away from the valve seat to an intermediate position, with the pressurized source and reduced pressure acting on said valve element whereby said intermediate position of the valve element being correlated with the incremented position of the pilot valve irrespective of the magnitude of the pressure of the pressurized source or the reduced pressure.

* * * * *